(12) United States Patent
Le et al.

(10) Patent No.: US 9,821,522 B2
(45) Date of Patent: Nov. 21, 2017

(54) AXICONS AND METHODS OF MAKING THE SAME

(75) Inventors: Anthony Van Le, San Jose, CA (US); Nicholas John Richardi, Manteca, CA (US)

(73) Assignee: POINCARE SYSTEMS, INC., Menlo Park, CA (US)

( * ) Notice: Subject to any disclaimer, the term of this patent is extended or adjusted under 35 U.S.C. 154(b) by 1040 days.

(21) Appl. No.: 13/448,289

(22) Filed: Apr. 16, 2012

(65) Prior Publication Data
US 2013/0272653 A1 Oct. 17, 2013

(51) Int. Cl.
| G02B 6/12 | (2006.01) |
| B29D 11/00 | (2006.01) |
| G02B 5/00 | (2006.01) |
| F21V 8/00 | (2006.01) |

(52) U.S. Cl.
CPC .......... B29D 11/0074 (2013.01); G02B 5/001 (2013.01); G02B 6/0008 (2013.01)

(58) Field of Classification Search
CPC ...................................................... G02B 13/18
See application file for complete search history.

(56) References Cited

U.S. PATENT DOCUMENTS

| 4,545,653 A * | 10/1985 | Brenden et al. .............. 359/719 |
| 5,943,161 A * | 8/1999 | Shinozaki ............. G02F 1/3534 359/326 |
| 6,411,377 B1* | 6/2002 | Noguchi et al. ........... 356/237.4 |
| 2005/0211885 A1* | 9/2005 | Tobiason ........... G01D 5/34723 250/231.13 |
| 2005/0271326 A1* | 12/2005 | Luo ................................ 385/43 |
| 2005/0271983 A1* | 12/2005 | Payne .......................... 430/321 |
| 2006/0093011 A1* | 5/2006 | Vancoille ...................... 372/101 |
| 2007/0121213 A1* | 5/2007 | Tseng et al. ................... 359/628 |
| 2008/0088959 A1* | 4/2008 | Ullman et al. ................ 359/861 |
| 2009/0040628 A1* | 2/2009 | Vancoille ...................... 359/727 |
| 2010/0088042 A1* | 4/2010 | Noguchi et al. ............... 702/40 |
| 2010/0097809 A1* | 4/2010 | Munro et al. ................. 362/308 |
| 2010/0244007 A1* | 9/2010 | Ono et al. ....................... 257/40 |
| 2010/0302803 A1* | 12/2010 | Bita et al. ..................... 362/606 |
| 2011/0257641 A1* | 10/2011 | Hastings et al. ................ 606/15 |

* cited by examiner

Primary Examiner — Thomas A Hollweg
Assistant Examiner — Mary A El Shammaa
(74) Attorney, Agent, or Firm — Vista IP Law Group, LLP

(57) ABSTRACT

A method of making an axicon includes providing a structure having an axicon-shape cavity, the cavity having a first end and a second end, the first end of the cavity having a cross sectional dimension that is smaller than the second end, placing a polymeric substance into the axicon-shape cavity, and forming an axicon using the polymeric substance.

21 Claims, 7 Drawing Sheets

AXICONS AND METHODS OF MAKING THE SAME

FIELD

This application relates to axicons and methods of making the same.

BACKGROUND

An axicon is a specialized type of lens which has a conical surface. An axicon may form a beam shape having a close relationship to a Bessel beam, or pencil beam like shape. An axicon may also transform a laser beam into a ring.

In some cases, an axicon may be used to turn a Gaussian beam into an approximation to a Bessel beam.

In existing techniques for making axicons, a glass substrate is first formed. Then the glass substrate is slowly grinded into a desired shape to form an axicon.

Applicant of the subject application determines that existing techniques for making axicons are slow and inefficient, and that it would be desirable to have improved techniques for making axicons.

SUMMARY

In accordance with some embodiments, a method of making an axicon includes providing a structure having an axicon-shape cavity, the cavity having a first end and a second end, the first end of the cavity having a cross sectional dimension that is smaller than the second end, placing a polymeric substance into the axicon-shape cavity, and forming an axicon using the polymeric substance.

In accordance with other embodiments, a method of forming a device having an axicon includes forming a structure having a first end, a second end, and a body extending between the first end and the second end, wherein the structure has a first cavity at the first end, the first and second ends defining an axis along the body, engaging a part of the structure with an end of a compressor, the end of the compressor having a recess, and pressing the part of the structure by the end of the compressor so that the part of the structure is molded by the recess at the compressor to form an axicon, the formed axicon and the first cavity being aligned along the axis.

In accordance with other embodiments, an optical apparatus includes a structure having a first end, a second end, and a body extending between the first end and the second end, the body of the structure defining a longitudinal axis, wherein the structure has a first cavity at the first end configured to receive an optical fiber, and wherein the structure has an axicon that is integral with a part of the structure, the first cavity and the axicon aligned along the longitudinal axis.

Other and further aspects and features will be evident from reading the following detailed description of the embodiments.

BRIEF DESCRIPTION OF THE DAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Figure 1A:
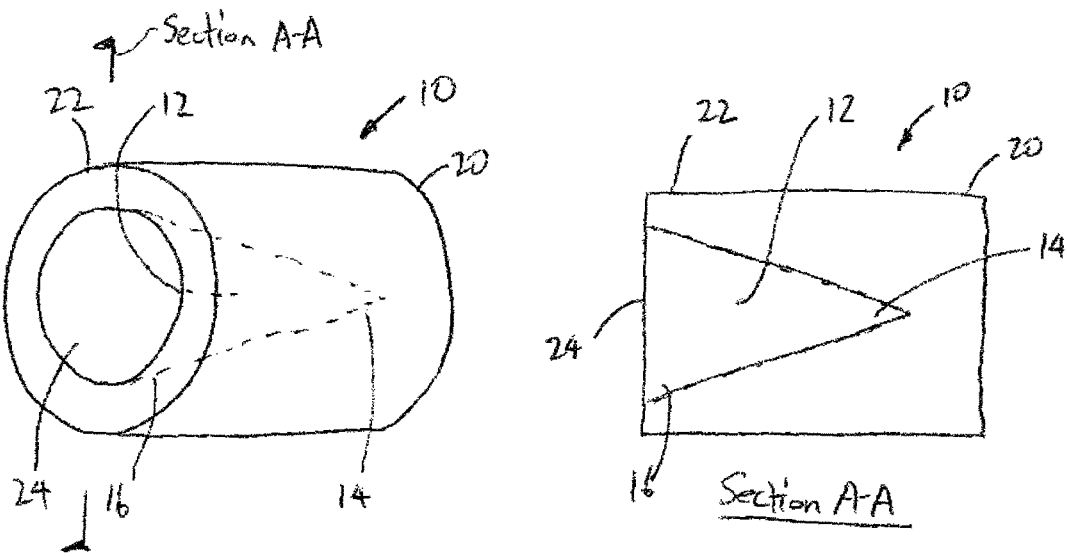
FIGS. 1A-1D illustrate a method of forming an axicon in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated or described.

FIGS. 1A-1D illustrate a method of making an axicon in accordance with some embodiments. First, a molding structure 10 is provided (FIG. 1A). The structure 10 has a cavity 12 with a first end 14, and a second end 16. The second end 16 of the cavity 12 has a larger cross sectional dimension than that at the first end 14. The cavity 12 has a shape of an axicon (e.g., a cone shape or a cone-like shape, an aspherical shape, a logarithmic shape, or otherwise an arbitrary shape such that the axicon can form a Bessel beam) that is desired to be formed using the structure 10. As shown in the figure, the structure 10 has a first end 20 that is closed, and a second end 22 having an opening 24 that extends into the cavity 12.

Figure 1B:
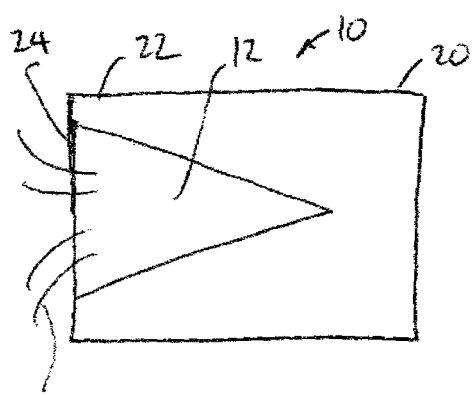

Next, a polymeric substance 40 is placed into the cavity 12 of the structure 10 (FIG. 1B). By means of non-limiting examples, the polymeric substance may be acrylonitrile-butadiene acrylate, acrylonitrile-butadiene styrene terpolymer, acrylonitrile-chlorinated polyethylene styrene terpolymer, acrylate maleic anhydride terpolymer, acrylonitrile-methyl methacrylate, amorphous polyolefin, acrylonitrile styrene copolymer, acrylonitrile styrene acrylate, bulk molding compound, bis maleimide, cellulose acetate, cellulose acetate butyrate, cellulose acetate proprionate, cellulose nitrate (celluloid), cycloolefin copolymer, copolyester thermoplastic elastomer, chlorinated polyethylene, chlorinated polyvinyl chloride, cellulose triacetate, chlorotrifluoroethylene, diallyl phthallate (thermoset), ethylene acrylic acid copolymer, ethyl cellulose, ethylene chlorotrifluoroethylene, ethylene-methyl acrylate copolymer, ethylene n-butyl acetate, epoxy, ethylene propylene diene monomer rubber, ethylene propylene copolymer rubber, ethylene propylene rubber, expandable polystyrene, ethylene tetrafluoroethylene, ethylene vinyl acetate, ethylene/vinyl acetate copolymer, ethylene vinyl alcohol, fluorinated ethylene propylene, fiber reinforced plastic, high density polyethylene, high impact polystyrene, high strength molding compound, high molecular weight high density polyethylene, ionomer, interpenetrating polymer network, liquid crystal polymer, low density polyethylene, linear low density polyethylene, linear polyethylene, maleic anhydride, methyl methacrylate/ABS copolymer, methyl methacrylate butadiene styrene terpolymer, medium density polyethylene, melamine formaldehyde, melamine phenolic, nitrile butadiene rubber, olefin modified styrene acrylonitrile, phenolic, polyamide (nylon), poly acetic acid, polyamide-imide, polyaryletherketone, polyester alkyd, polyanaline, polyacrylonitrile, polyaryl amide, polyarylsulfone, polubutylene, polybutadiene acrylonitrile, polybutadine, polybenzimidazole, polybutylene napthalate, polybutadiene styrene, polybutylene terephthalate, polycarbonate, polycarbonate/acrylonitrile butadiene styrene blend, polycaprolactone, polycyclohexylene terephthalate, glycol modified polycyclohexyl terephthalate, polymonochlorotrifluoroethylene, polyethylene, polyether block amide or polyester block amide, polyetheretherketone, polyetherimide, polyetherketone, polyetherketone etherketone ketone, polyetherketoneketone, polyethylene naphthalene, polyethylene oxide, polyethersulfone, polyethylene terephthalate, glycol modified polyethylene terephthalate, perfluoroalkoxy, polyimide, polyisoprene, polyisobutylene, polyisocyanurate, polymethactylonitrile, polymethylmethacrylate (acrylic), polymethylpentene, paramethylstyrene, polyolefin, polyoxymethylene (acetal), polypropylene, polyphthalamide, chlorinated polypropylene, polyphthalate carbonate, polyphenylene ether, polymeric polyisocyanate, polyphenylene oxide, polypropylene oxide, polyphenylene sulfide, polyphenylene sulfone, polypropylene terephthalate, polystyrene, polystyrene/polyisoprene block copolymer, polysulfone, polytetrafluoroethylene, polytetramethylene terephthalate, polyurethane, polyvinyl alcohol (sometimes polyvinyl acetate), polyvinyl acetate, polyvinyl butyryl, polyvinyl chloride, polyvinyl chloride acetate, polyvinylidene acetate, polyvinylidene chloride, polyvinylidene fluoride, polyvinyl fluoride, polyvinyl carbazole, polyvinyl alcohol, polyvinyl pyrrolidone, styrene acrylonitrile, styrene butadiene, styrene butadiene rubber, styrene butadiene styrene block copolymer, styrene ethylene butylene styrene block copolymer, silicone, styrene isoprene styrene block copolymer, styrene maleic anhydride copolymer, sheet molding compound, styrene methyl methacrylate, styrene/a-methyl styrene, styrene vinyl acrylonitrile, thermoplastic elastic olefin, thermoplastic elastomer, thermoplastic elastomer—olefinic, thermoplastic elastomer—styrenic, thick molding compound, thermoplastic urethane, thermoplastic vulcanites, urea formaldehyde, ultrahigh molecular weight polyethylene, ultra low density polyethylene, unsaturated polyester (thermoset), vinyl acetate, vinyl acetate ethylene, very low density polyethylene, expandable polystyrene, etc.

In the illustrated embodiments, the polymeric substance 40 is in liquid form, and the act of placing the polymeric substance 20 involves pouring or injecting the polymeric substance 20 into the cavity 12. In other embodiments, the polymeric substance 40 may be in solid form, or a gel form.

Figure 1C:
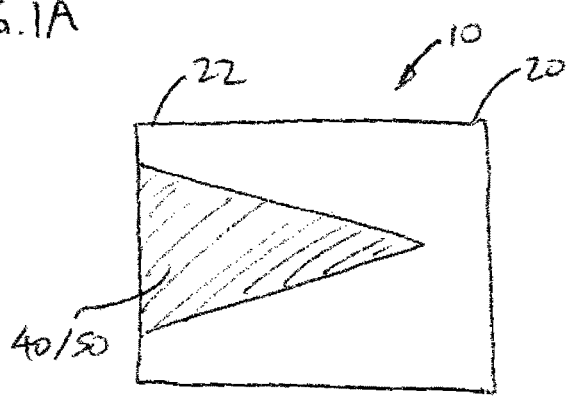
Figure 1D:
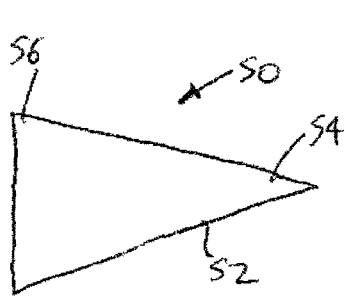

After the polymeric substance 40 is placed into the cavity 12, the polymeric substance 40 is then cured, and the cured polymeric substance 40 becomes an axicon 50 (FIG. 1C). The axicon 50 may then be removed from the structure 10 (FIG. 1D). In some embodiments, the polymeric substance 40 may be cured by solidifying the polymeric substance 40, thereby forming the axicon 50. In other embodiments, the polymeric substance 40 may be heated (e.g., before, during, or after the polymeric substance 40 is placed inside the cavity 12), and the act of curing the polymeric substance 40 comprises cooling the polymeric substance 40. In still other embodiments, the act of curing the polymeric substance 40 may include using a UV light to cure the polymeric substance 40. In one implementation, the structure 10 may be made from a transparent or a semi-transparent material that allows at least some of the UV light from a UV light source to transmit therethrough. In such cases, the UV light source may be placed outside the cavity 16 of the structure 10, and emits UV light towards the structure 10. At least some of the UV light penetrates through the structure 10 to reach the polymeric substance 40 in the cavity 16. In further embodiments, heat from a heat source may be applied to the polymeric substance 40 to cure the polymeric substance 40. Other techniques for curing a polymeric substance may also be used in other embodiments.

Figure 2A:
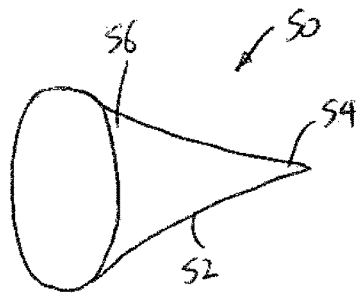
FIGS. 2A-2B illustrate different axicons that may be formed using the method of FIGS. 1A-1D.
Figure 2B:
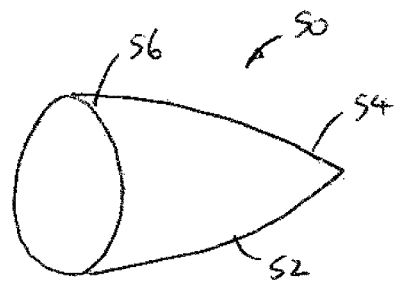

As shown in FIG. 1D, the axicon 50 has a first end 54 and a second end 56, wherein the first end 54 has a cross sectional dimension that is smaller than that of the second end 56. The formed axicon 50 has a cone or a cone-like configuration. In some embodiments, the axicon 50 may have a circular cross sectional shape that decreases in dimension from the second end 56 towards the first end 54. As shown in FIG. 1D, the formed axicon 50 has a cross sectional side profile 52 that is rectilinear. In such configuration, the cross sectional dimension of the axicon 50 increases from a first end 54 to a second end 56 in a linear manner. In other embodiments, the cavity 12 of the structure 10 may have a cross sectional side profile that is curvilinear to thereby form an axicon 50 having a corresponding cross sectional side profile that is curvilinear (FIGS. 2A, 2B). In the configuration shown in FIG. 2A, the cross sectional dimension of the axicon 50 increases from first end 54 in a gradual manner, and then exponentially towards the second end 56. In the configuration shown in FIG. 2B, the cross sectional dimension of the axicon 50 increases from the first end 54 exponentially, and then gradually towards the second end 56.

Figure 3A:
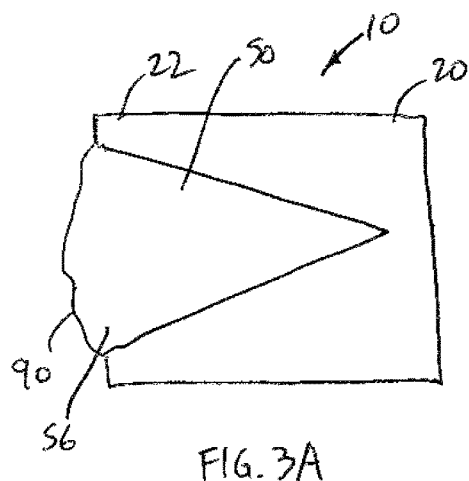
FIGS. 3A-3B illustrate a method of removing a part of an axicon in accordance with some embodiments.
Figure 3B:
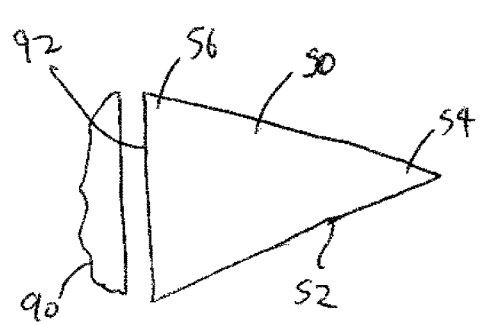

In some embodiments, the axicon 50 formed may have some imperfection 90 at the second end 56 (FIG. 3A). In such cases, a cutting tool may be used to remove the imperfection 90 (e.g., extra material) at the second end 56. For example, a cutter (e.g., a laser cutter, blade, etc.) may be used to cut through the cross section of the axicon 50 at the second end 56 to create a flat surface 92 (FIG. 3B). In some embodiments, the cutting of the material at the second end 56 of the axicon 50 may be performed while the axicon 50 is in the structure 10. In other embodiments, the cutting of the material at the second end 56 of the axicon 50 may be performed after the axicon 50 is removed from the structure 10. The removal of the axicon 50 from the structure 50 may be performed manually by hand, or alternatively, automatically by a machine (e.g., a robotic arm, positioner, etc.).

Figure 3C:
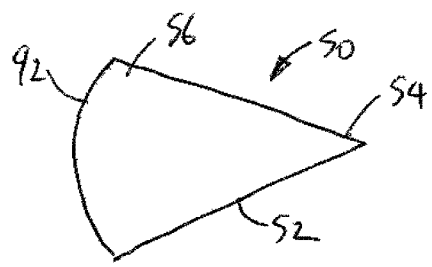
FIG. 3C illustrates an axicon with a convex surface at one end.
Figure 3D:
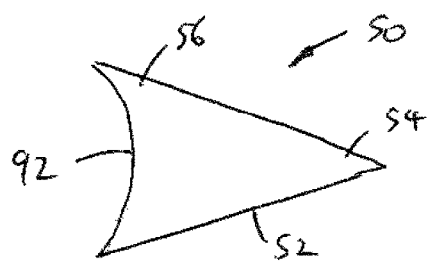
FIG. 3D illustrates an axicon with a concave surface at one end.

In other embodiments, instead of creating a flat surface, the cutting may be performed to create a curvilinear surface at the second end 56 of the axicon 50. For example, in some embodiments, the second end 56 of the axicon 50 may be cut to create a convex surface 92 (FIG. 3C). In other embodiments, the second end 56 of the axicon 50 may be cut to create a concave surface 92 (FIG. 3D). An axicon 50 with a curvilinear end surface is advantageous because it allows another optical device (e.g., a lens) with a corresponding curvilinear end surface to couple thereto.

Figure 4A:
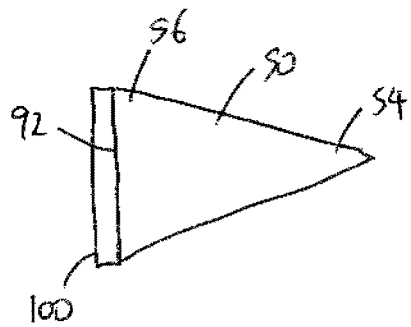
FIG. 4A-4G illustrate different optical devices that may be coupled to an axicon in accordance with different embodiments.

In one or more embodiments, after the axicon 50 is formed, one or more optical devices may be secured to the axicon 50. For example, in some embodiments, a reflective layer 100 may be secured to the second end 56 of the axicon 50 (FIG. 4A). In some embodiments, the reflective layer 100 may be deposited on the surface 92 at the second end 56 of the axicon 50. In other embodiments, the reflective layer 100 may be formed first, and is then secured (e.g., via an adhesive) to the surface 92 at the second end 56 of the axicon 50. In some embodiments, the reflective layer 100 may be configured to provide a reflection that is anywhere between 10% and 30%, and more preferably, anywhere between 15% and 25% (e.g., 19%). In other embodiments, the reflective layer 100 may be configured to provide reflection at other percentages. In the illustrated embodiments, the reflective layer 100 has a flat profile for allowing it to be secured on the flat surface 92 of the axicon 50. In other embodiments, if the axicon 50 has a curvilinear surface 92 (like that shown in FIG. 3C or FIG. 3D), the reflective layer 100 may then have a curvilinear profile. Also, in some embodiments, the reflective layer 100 may be considered to be a part of the axicon 50.

Figure 4B:
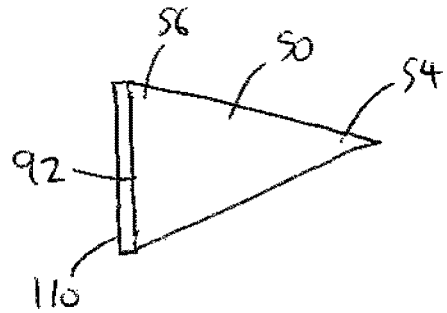
Figure 4C:
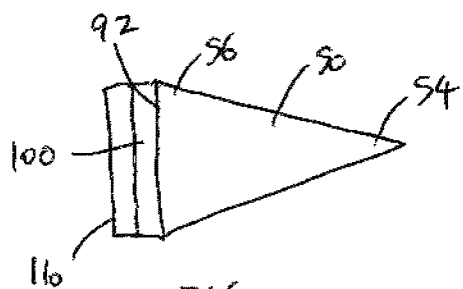

In other embodiments, a collimation lens 110 may be secured to the second end 56 of the axicon 50 (FIG. 4B). For example, in some embodiments, the collimation lens 110 may be secured (e.g., via an adhesive) to the surface 92 at the second end 56 of the axicon 50. In other embodiments, if the axicon 50 has the reflective layer 100, the collimation lens 110 may be secured (e.g., via an adhesive) to the reflective layer 110 (FIG. 4C). In some embodiments, the collimation lens 110 may be considered to be a part of the axicon 50.

Figure 4D:
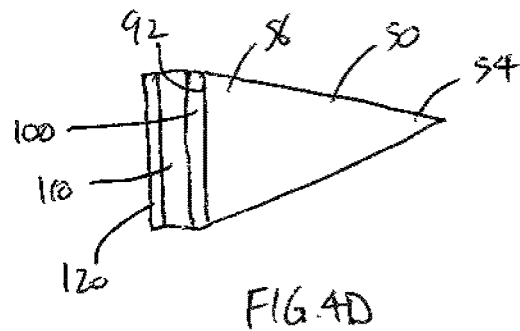

In further embodiments, a second reflective layer may be secured to the second end 56 of the axicon 50. For example, as shown in FIG. 4D, in some embodiments, a second reflective layer 120 may be secured (e.g., via an adhesive) to the collimation lens 110. In some embodiments, the second reflective layer 120 may be considered to be a part of the axicon 50.

Figure 4E:
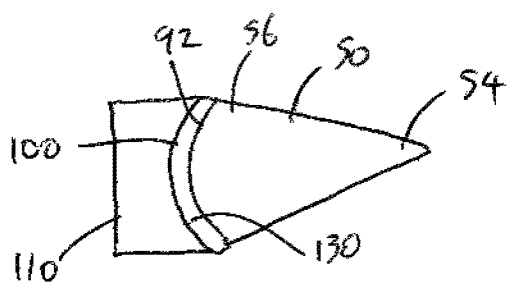
Figure 4F:
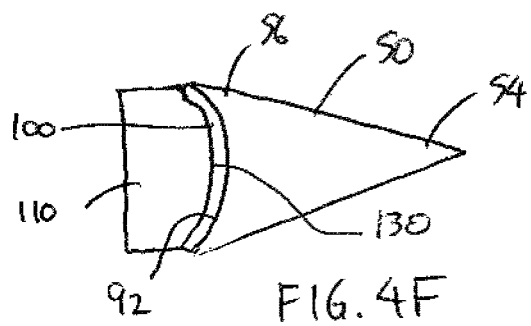

In still further embodiments, if the second end 56 of the axicon 50 has a curvilinear surface 92, the optical device securing to the axicon 50 may have a corresponding curvilinear surface. For example, as shown in FIG. 4E, the collimation lens 110 may have a curvilinear surface 130 that corresponds with the convex surface 92 of the axicon 50. In another example, the collimation lens 110 may have a curvilinear surface 130 that corresponds with the concave surface 92 of the axicon 50 (FIG. 4F).

Figure 4G:
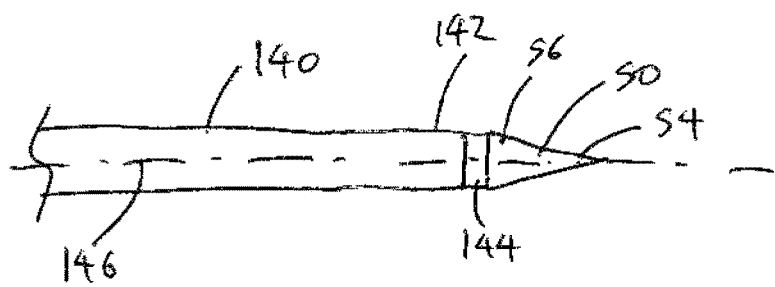

In one or more embodiments, a fiber optic may be communicatively coupled to the axicon 50. For example, as shown in FIG. 4G, a fiber optic 140 with an end 142 may be coupled to the second end 56 of the axicon 50 through a medium 144. In some embodiments, the medium 144 may be air. In other embodiments, the medium 144 may be a gel substance. In further embodiments, the medium 144 may be an adhesive that hardens after it is applied between the fiber optic 140 and the axicon 50. As shown in the figure, the fiber optic 140 and the axicon 50 are communicatively coupled to each other so that the fiber optic 140 is aligned with the axicon 50 along an axis 146. In some embodiments, the fiber optic 140 may have a reflective index of 1.5. In other embodiments, the fiber optic 140 may have a reflective index of other values. Also, in some embodiments, the medium 144 may have a reflective index that matches that of the fiber optic 140 so that light transmitted from the fiber optic 140 to the medium 144 will not be reflected back towards the fiber optic 140. In other embodiments, the fiber optic 140 and the medium 144 may have different respective reflective indexes.

It should be noted that the type of optical devices that may be secured to the axicon 50 is not limited to the examples described, and that other optical device(s) may be secured to the axicon 50 in other embodiments. Also, in one or more embodiments, the securing of the optical device(s) to the axicon 50 may be performed while the axicon 50 is in the structure 10. In other embodiments, the securing of the optical device(s) to the axicon 50 may be performed after the axicon 50 is removed from the structure 10.

Figure 5A:
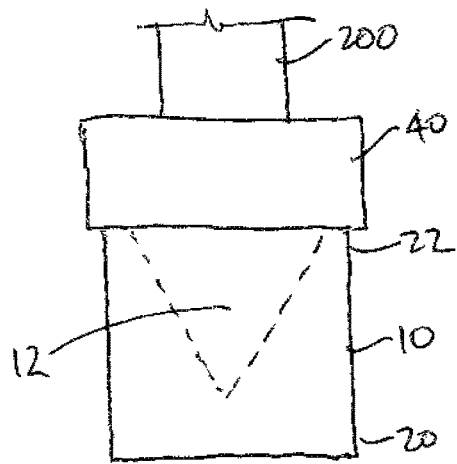
FIGS. 5A-5B illustrate another method of forming an axicon in accordance with other embodiments.
Figure 5B:
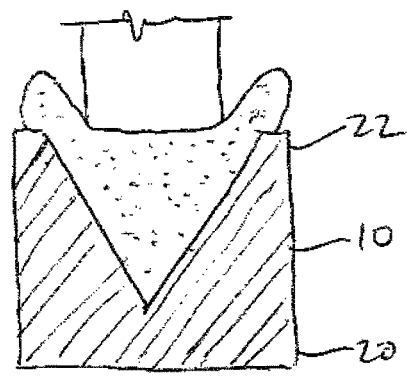

As mentioned, in some embodiments, the polymeric substance 40 for forming the axicon 50 may be in solid form. In some embodiments, the solid polymeric substance 40 may be in the form of particles, which is placed inside the cavity 12. Then a plunger may be used to press the polymeric substance 40 inside the cavity 12. In other embodiments, the solid polymeric substance 40 may be in a form of a block. In such cases, the polymeric substance 40 may be placed between the structure 10 and a plunger 200 (FIG. 5A). The plunger 200 may then be used to press the polymeric substance 40 so that the polymeric substance 40 is urged into the cavity 16 of the structure 10, until the cavity 16 is filled completely with the solid polymeric substance 40 (FIG. 5B). The polymeric substance 40 may then be cured (e.g., using any of the techniques described herein, or any of other techniques) to form the axicon 50. In some embodiments, the second end 56 of the axicon 50 may be cut to create a flat or a curvilinear surface 92 (like those described with reference to FIGS. 3A-3D). Also, in some embodiments, one or more optical devices may be secured to the second end 56 of the axicon 50 (like those described with reference to FIGS. 4A-4G).

Figure 6:
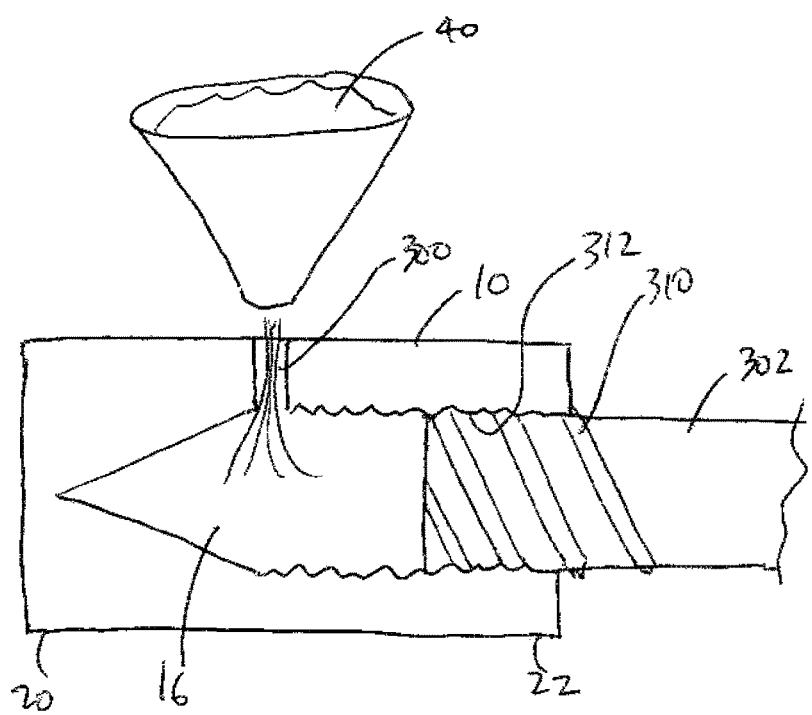
FIG. 6 illustrates another method of forming an axicon in accordance with other embodiments.

In the above embodiments, the polymeric substance 40 has been illustrated as being delivered through the opening 24 of the molding structure 10 into the cavity 16 of the structure 10. In other embodiments, the polymeric substance 40 may be delivered into the cavity 16 of the structure 10 through other locations at the structure 10. For example, in other embodiments, the structure 10 may have an opening 300 between the first end 20 and the second end 22 (FIG. 6). In such cases, the polymeric substance 40 (e.g., in solid form) may be delivered into the cavity 16 through the opening 300. A plunger 302 may then be used to press the solid polymeric substance 40 inside the cavity 16 so that the portion of the cavity 16 for forming the axicon 50 is filled with the solid polymeric substance 40. As shown in the figure, the plunger 302 has threads that mates with inner threads at the structure 10. During use, the plunger 302 may be rotated (e.g., by hand, or robotically) to advance the plunger 302 relative to the structure 10 to thereby compress the polymeric substance 40 in the structure 10.

In other embodiments, the polymeric substance 40 may be in liquid form. In such cases, the setup shown in FIG. 6 may be rotated 90 degree so that as the polymeric substance 40 is delivered into the cavity 16, the polymeric substance 40 will drop (due to gravity) into the narrower part of the cavity 16 at the first end 20 of the structure 10. The liquid form of the polymeric substance 40 and the gravity will cause the lower part of the cavity 16 to be completely filled with the polymeric substance 40.

As illustrated in the above embodiments, because a molding technique and polymeric substance are used to form the axicon 50, the manufacturing process of the axicon 50 does not involve any grinding of a glass substrate. Thus, embodiments of the axicon forming technique described herein allow axicons to be formed more quickly, more efficiently, and less costly, compared to existing techniques. In some embodiments, the molding techniques described herein may be employed to mass produce axicons. For example, in some embodiments, the structure 10 may have a plurality of cavities 12 (e.g., arranged in a row, or in a two dimensional matrix) for forming corresponding axicons 50.

Figure 7A:
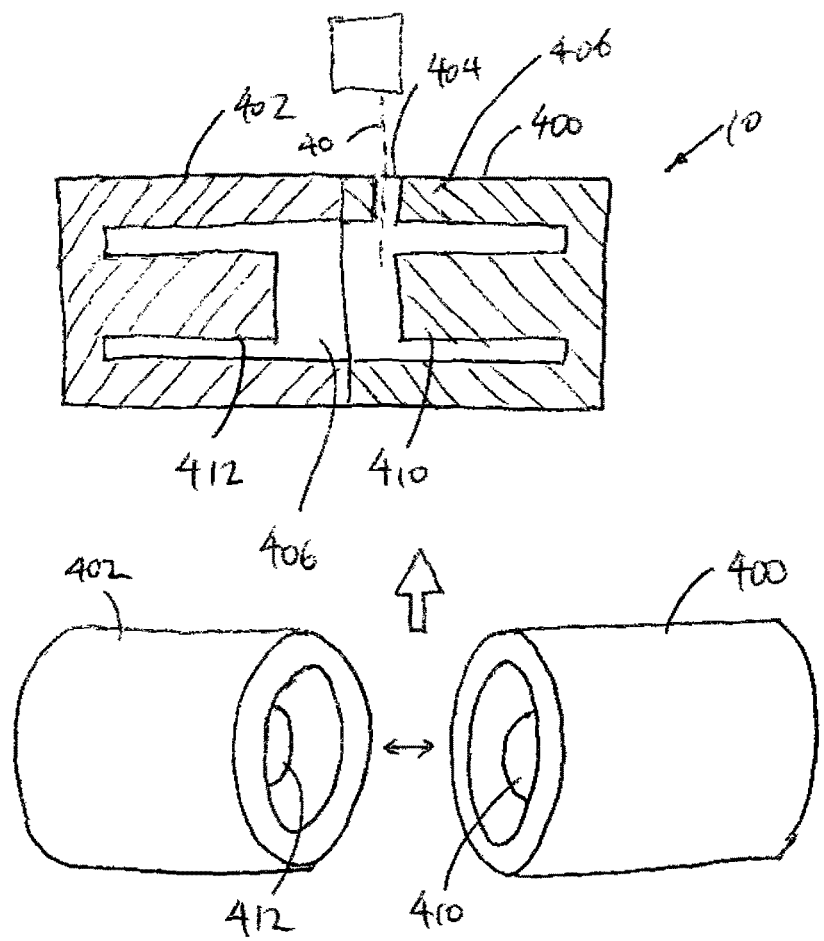
FIGS. 7A-7E illustrate another method of forming an axicon in accordance with other embodiments

It should be noted that the structure 10 for forming the axicon 50 is not limited to the examples described, and that the structure 10 may have other configurations in other embodiments. For example, in other embodiments, the structure 10 may have a configuration for forming a coupling device that includes an axicon. FIGS. 7A-7E illustrate a method of forming an optical device that includes an axicon and a coupling portion in accordance with some embodiments. In the illustrated embodiments, the structure 10 has a first portion 400 and a second portion 402 that can be detachably coupled to the first portion 400 (FIG. 7A). The first portion 400 has an opening 404 extending through a wall 406 of the first portion 400. The two portions 400, 402 cooperate with each other to provide a mold for forming a coupling sleeve. In particular, during use, the two portions 400, 402 may be coupled to each other to form the structure 10 having a cavity 406. The structure 10 has a cylindrical configuration with a first protrusion 410 inside the cavity 406, and a second protrusion 412 inside the cavity 406. Then a polymeric substance 40 may be placed inside the cavity 406 through the opening 404.

Figure 7B:
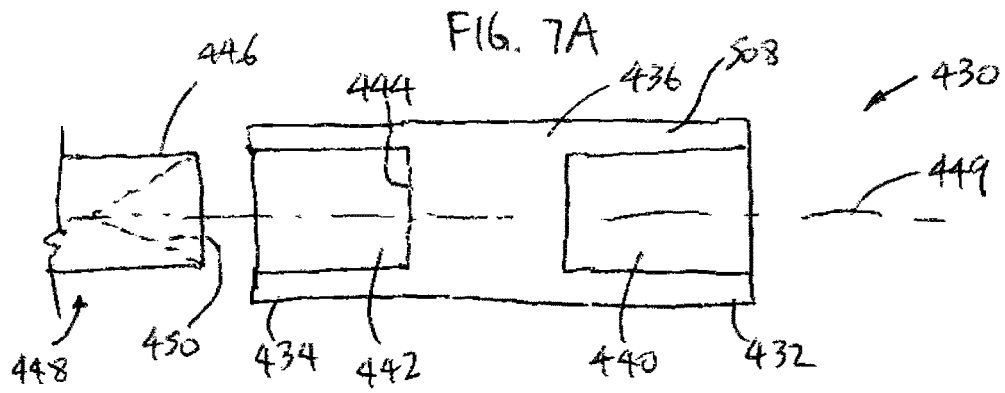

The polymeric substance 40 is then cured (e.g., using any of the techniques described, including but not limited to using heating, cooling, UV light, etc.). After the polymeric substance 40 is cured to form the optical device 430, the two portions 400, 402 of the structure 10 may be decoupled to allow the optical device 430 to be removed (FIG. 7B). In the illustrated embodiments, the optical device 430 is a sleeve structure having a first end 432, a second end 434, and a body 436 extending between the first end 432 and the second end 434. The structure 430 also has a first cavity 440 formed by the first protrusion 410 of the molding structure 10, and a second cavity 442 formed by the second protrusion 412 of the molding structure 10. As shown in the figure, the body 436 of the optical device 430 defines a longitudinal axis 449, which extends between the first and second ends 432, 434. Also, the optical device 430 has a tubular portion 508 extending between the ends 432, 434.

Figure 7C:
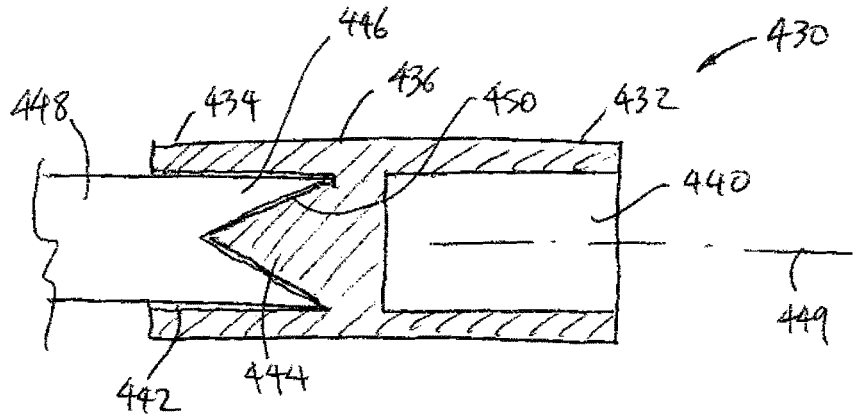
Figure 7D:
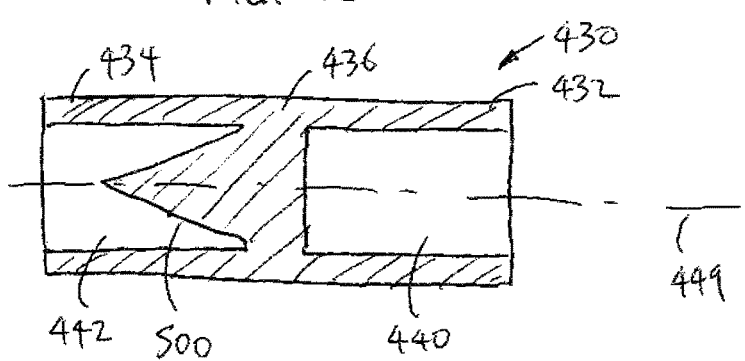

Next, a compressor 448 may be positioned in alignment with the second cavity 442 of the structure 430 so that the compressor 448 and the structure 430 are aligned along the axis 449. Then the compressor 448 is inserted into the second cavity 442 until a part 444 of the structure 430 in the inside end of the second cavity 442 is engaged with an end 446 of a compressor 448 (FIGS. 7B-7C). In some embodiments, the insertion of the compressor 448 into the second cavity 442 may be accomplished by moving the compressor 448 towards the structure 430. In other embodiments, the insertion of the compressor 448 into the second cavity 442 may be accomplished by moving the structure 430 towards the compressor 448. In the illustrated embodiments, the end 446 of the compressor 448 has a recess 450. The recess 450 has an axicon-shape (e.g., a cone shape or a cone-like shape) for forming an axicon. As shown in FIG. 7C, the part 444 of the structure 430 is pressed by the end 446 of the compressor 448 so that it is molded into an axicon shape by the axicon-shape cavity 450, thereby forming an axicon 500. In some embodiments, as the part 444 is being pressed, the part 444 may undergo plastic deformation. After the axicon 500 is formed, the compressor 448 may then be removed from the second cavity 442. As shown in FIG. 7D, the formed axicon 500 and the first cavity 440 are aligned along the axis 449. The first cavity 440 is configured to receive an optical fiber so that when the optical fiber is inserted into the first cavity 440, the optical fiber will be automatically aligned with the axicon 500 along the axis 449.

In some embodiments, the optical structure 430 has a cross sectional dimension that is 1 mm or less. For example, in some embodiments, the cross sectional dimension may be a value that is anywhere from 0.5 micron to 10 micron. In other embodiments, the cross sectional dimension may have other values. For example, in other embodiments, the cross sectional dimension may be a value anywhere from 25 microns to 100 microns.

Figure 7E:
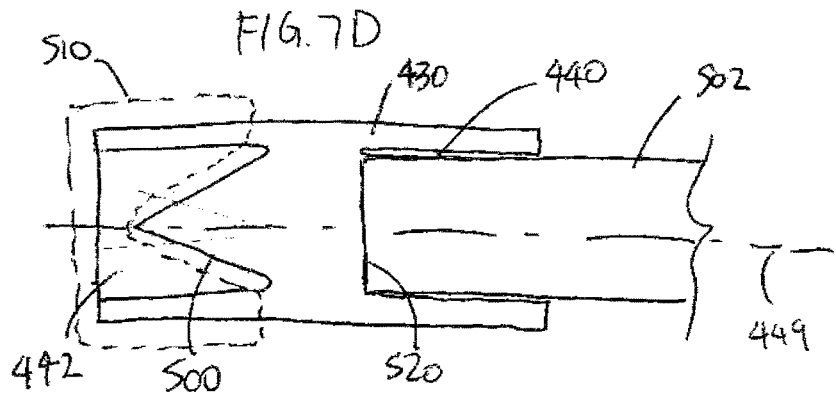

Next, an end of an optical fiber 502 may be inserted into the first cavity 440 of the structure 430 so that the optical fiber 502 is aligned with the axicon 500 along the axis 449 (FIG. 7E). This is possible because the first cavity 440 has a configuration (e.g., size and/or shape) for allowing the end of the optical fiber 502 to be inserted therein. In some embodiments, the optical fiber 502 may be considered to be a part of the optical device 430. As shown in the figure, the first cavity 440 and the second cavity 442 are separated by the part 444 of the structure 430 that forms the axicon 500. In some embodiments, the entire structure 430 that includes the tubular portion 508 and the axicon 500 is molded from a material that is at least partially transparent to light. This allows light signals to be transmitted from the optical fiber 502 to the axicon 500, and exit the axicon 500. Also, in some embodiments, an opaque layer may be placed around the optical device 430 to prevent light from escaping from within the optical device 430, and to prevent light from going into the optical device 430 from outside the optical device 430. In some embodiments, the opaque layer may be considered to be a part of the optical device 430.

In other embodiments, one or more optical devices may be coupled to the optical device 430. For example, in other embodiments, a reflective layer, a collimation lens, or a combination of the foregoing, may be attached to an end surface 520 in the first cavity 440 of the structure 430. In some embodiments, the additional optical device(s) may be considered to be a part of the optical device 430.

As shown in the above embodiments, the technique for forming the optical device 430 that includes the axicon 500 is advantageous because the formed optical device 430 has an axicon that is integral with the tubular portion 508 (sleeve) of the structure 430. Such technique obviates the need to have an extra process to attach an axicon to a sleeve. The formed structure 430 has the axicon 500 together with a connector (e.g., the tubular portion 508) that allows the axicon 500 to be coupled to the optical fiber 502. Also, the formed axicon 500 is automatically aligned with the first cavity 440 along the longitudinal axis 449, which obviates the need to have a separate alignment process for aligning an axicon to an optical fiber while securing the axicon to the optical fiber. Furthermore, because a molding technique and polymeric substance are used to form the axicon 500, the manufacturing process of the axicon 500 does not involve any grinding of a glass substrate. Thus, embodiments of the axicon forming technique described herein allow axicons to be formed more quickly, more efficiently, and less costly, compared to existing techniques. In some embodiments, the molding techniques described herein may be employed to mass produce axicons. For example, in some embodiments, the first portion 400 may include a plurality of first molding portions, and the second portion 402 may include a plurality of second molding portions. The first and second portions 400, 402 may be coupled to provide a plurality of molds (each of which is formed with a first molding portion and a corresponding second molding portion) to form a plurality of corresponding optical devices 430.

In some embodiments, after the axicon 500 is formed, a portion 510 (shown in FIG. 7E) of the optical structure 430 may be removed (e.g., by cutting off the portion 510). In other embodiments, after the axicon 500 is formed, the portion 510 may remain intact with the optical structure 430 so that the axicon 500 remains within the second cavity 442. In such cases, the second cavity 442 of the structure 430 may be used to house another component, e.g., another optical component, such as a lens, another fiber optic, etc.

Figure 8:
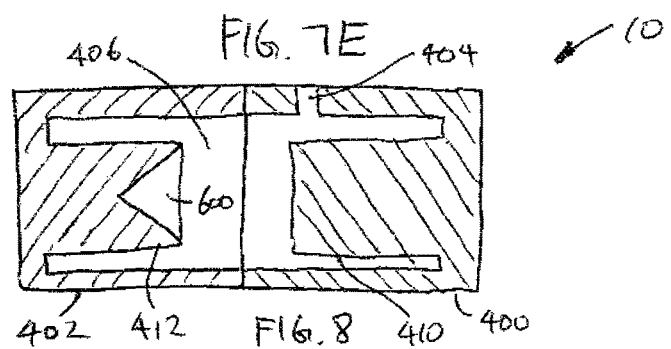
FIG. 8 illustrates another structure for forming an optical device having an axicon in accordance with other embodiments.

In other embodiments, the compressor 448 may not be needed. For example, in other embodiments, the second portion 402 of the molding structure 10 may include an axicon-shape cavity 600 for forming the axicon 500 (FIG. 8). In such cases, after the polymeric substance is placed into the cavity 406 of the structure 10, some of the polymeric substance will go into the axicon-shape cavity 600 to form the axicon 500 after the polymeric substance is cured. The formed axicon 500 will be integral with the rest of the optical device 430 so that the axicon 500 together with other parts (e.g., the tubular portion 508) of the device 430 will have a unity configuration.

In one or more embodiments, a surface of the axicon (e.g., the axicon 50, the axicon 500, etc.) may be polished. For example, in some embodiments, the axicon may be placed inside a chamber, and a heated substance may be placed inside the chamber to emit a vapor (e.g., a solvent fume). In some embodiments, the solvent fume may include methylene chloride. In other embodiments, the solvent fume may include other substance. The solvent fume interacts with the axicon's surface to polish the axicon's surface through a chemical process. In other embodiments, the surface of the axicon may be polished using other techniques. For example, in other embodiments, the surface of the axicon may be polished using mechanical techniques, such as through sanding.

Although the above embodiments have been described with reference to axicon having a cone or cone-like shape, in other embodiments, the axicon may have other configurations. For example, in other embodiments, the axicon may be a Fresnel lens having a plurality of concentric rings. In such cases, instead of the cone or cone-like shape cavity 450, the compressor 448 may have a plurality of concentric rings at the distal tip. During use, the compressor 448 may compress against the portion 444 of the optical device 430 to thereby form a plurality of concentric rings for the axicon 500.

Also, in other embodiments, instead of axicons, any of the techniques described herein may be employed to form other types of optical devices.

Figure 9:
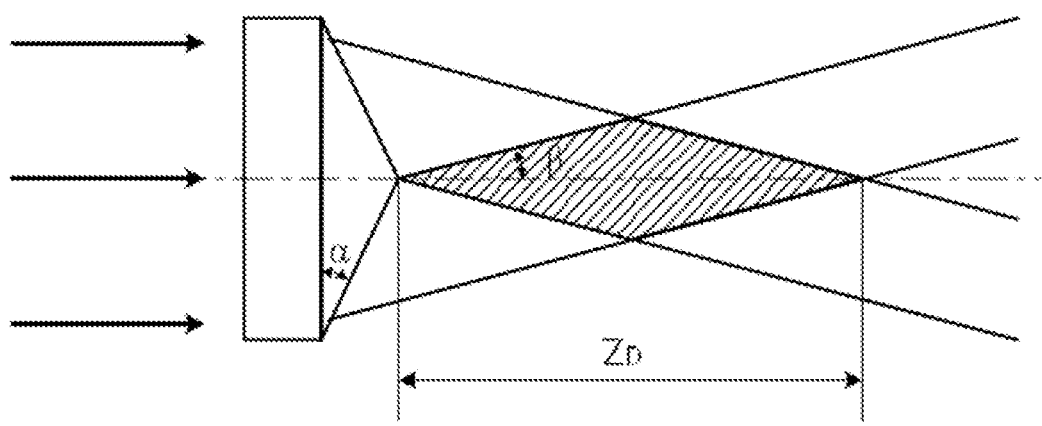
FIG. 9 illustrates an axicon with its depth of focus in accordance with some embodiments.

FIG. 9 illustrates an example of an axicon that may be formed using embodiments of the techniques described herein. As showing in the figure, the axicon has an associated depth of focus $Z_D$. In some embodiments, the depth of focus $Z_D$ for an axicon may be represented by the equation:

$$Z_D = \frac{d}{2(n-1)\alpha}$$

where $Z_D$ is the depth of focus (depth of field), d is the diameter of the optical beam at the entrance surface of the axicon, n is the index of refraction of the axicon, and a is the axicon angle. The central lobe diameter (main beam spot diameter) approximating a $J_0$ bessel function may be calculated by the equation:

$$\rho_0 = \frac{2.4048\lambda}{2\pi\sin\beta}$$

where $\lambda$ is the central wavelength of the optical beam, $\beta$ is the beam deviation angle. $\beta$ may be calculated by the equation:

$$\beta = \sin^{-1}(n \sin \alpha) - \alpha$$

where $\alpha$ is the axicon angle, n is the index of refraction of the axicon.

As an example, for an entrance beam having a diameter of 300 microns entering into the axicon at a center wavelength of 1310 nanometers, and with the axicon having an $\alpha$ angle of 2 degrees, and a refractive index of 1.5, the beam diameter may be determined as approximately 28.48 microns, with a depth of focus of approximately 8594.36 microns based on the above equations.

As another example, for an entrance beam having a diameter of 800 microns entering into the axicon at a center wavelength of 1310 nanometers, and with the axicon having an $\alpha$ angle of 2 degrees, and a refractive index of 1.5, the beam diameter may be determined as approximately 28.48 microns, with a depth of focus of approximately 22918.31 microns based on the above equations.

As a further example, for an entrance beam having a diameter of 800 microns entering into the axicon at a center wavelength of 1310 nanometers, and with the axicon having an $\alpha$ angle of 30 degrees, and a refractive index of 1.5, the beam diameter may be determined as approximately 1.56 microns, with a depth of focus of approximately 1527.88 microns based on the above equations.

In one or more embodiments, the beam entrance diameter into axicon (e.g., an axicon made by any of the embodiments of the techniques described herein) may be anywhere from 10 um to 10 mm, and more preferably anywhere from 100 um to 1 mm, and even more preferably anywhere from 200 um to 1000 um. In other embodiments, the beam entrance diameter may be different from the above examples.

In one or more embodiments, the beam wavelength for an axicon (e.g., an axicon made by any of the embodiments of the techniques described herein) may be anywhere from 200 nm to 10000 nm, and more preferably anywhere from 800 nm to 2000 nm. In other embodiments, the beam wavelength may be different from the above examples.

In one or more embodiments, the depth of focus for an axicon (e.g., an axicon made by any of the embodiments of the techniques described herein) may be at least 1 mm, and more preferably at least 3 mm, and even more preferably greater than 5 mm. In other embodiments, the depth of focus may be different from the above examples.

In one or more embodiments, the beam spot size for an axicon (e.g., an axicon made by any of the embodiments of the techniques described herein) may be 100 um or less, and more preferably anywhere from 20 um to 80 um, and even more preferably anywhere from 0.5 um to 50 um. In other embodiments, the beam spot size may be different from the above examples.

In one or more embodiments, the axicon refractive index for an axicon (e.g., an axicon made by any of the embodiments of the techniques described herein) may be greater than 1, and more preferably greater than 1.3, and even more preferably greater than 1.6. In other embodiments, the axicon refractive index may be different from the above examples.

In other embodiments, the axicon may have a shape other than a conical shape. For examples, alternative shapes may include a single or biconvex aspherical axicon or logarithmic axicon which has one or two curved surfaces forming the lens. Other alternative shapes may include a Fresnel lens, or Fresnel zone plate, in which concentric rings of a geometric profile such that the Gaussian beam passing through the lens forms an approximation of a $J_0$ Bessel beam.

Although particular embodiments have been shown and described, it will be understood that they are not intended to limit the claimed invention, and it will be obvious to those skilled in the art that various changes and modifications may be made without departing from the spirit and scope of the claimed invention. The specification and drawings are, accordingly, to be regarded in an illustrative rather than restrictive sense. The claimed invention are intended to cover alternatives, modifications, and equivalents.

What is claimed:

1. A method of making an axicon lens, comprising:
   providing a structure having an axicon-shape cavity, the cavity having a first end and a second end, the first end of the cavity having a cross sectional dimension that is smaller than the second end;
   placing a polymeric substance into the axicon-shape cavity;
   forming an axicon lens using the polymeric substance, wherein the formed axicon lens has a first end and a second end, the first end having a smaller cross section than the second end; and
   placing reflective material at the second end of the axicon lens.

2. The method of claim 1, wherein the act of placing the polymeric substance into the axicon-shape cavity comprises:
   placing the polymeric substance at one end of the axicon-shape cavity; and
   using a plunger to press the polymeric substance into the axicon-shape cavity.

3. The method of claim 1, wherein the structure has an opening between the first end and a second end, and the act of placing the polymeric substance into the axicon-shape cavity comprises delivering the polymeric substance through the opening.

4. A method of making an axicon lens, comprising:
   providing a structure having an axicon-shape cavity, the cavity having a first end and a second end, the first end of the cavity having a cross sectional dimension that is smaller than the second end;
   placing a polymeric substance into the axicon-shape cavity;
   forming an axicon lens using the polymeric substance, wherein the formed axicon lens has a first end and a second end, the first end having a smaller cross section than the second end;
   attaching a collimation lens to the second end of the axicon lens; and
   placing reflective material at the collimation lens.

5. The method of claim 4, wherein the act of placing the polymeric substance into the axicon-shape cavity comprises:
   placing the polymeric substance at one end of the axicon-shape cavity; and
   using a plunger to press the polymeric substance into the axicon-shape cavity.

6. The method of claim 4, wherein the structure has an opening between the first end and a second end, and the act of placing the polymeric substance into the axicon-shape cavity comprises delivering the polymeric substance through the opening.

7. A method of making an axicon lens, comprising:
   providing a structure having an axicon-shape cavity, the cavity having a first end and a second end, the first end of the cavity having a cross sectional dimension that is smaller than the second end;
   placing a polymeric substance into the axicon-shape cavity;
   forming an axicon lens using the polymeric substance, wherein the formed axicon lens has a first end and a second end, the first end having a smaller cross section than the second end; and
   coupling a fiber optic to the second end of the axicon lens.

8. The method of claim 7, wherein the polymeric substance is in liquid form, and the act of placing the polymeric substance into the cavity comprises pouring or injecting the polymeric substance into the cavity.

9. The method of claim 8, wherein the act of forming the axicon lens comprises solidifying the polymeric substance.

10. The method of claim 9, wherein the polymeric substance is heated, and the act of solidifying the polymeric substance comprises cooling the polymeric substance.

11. The method of claim 9, wherein the act of solidifying the polymeric substance comprises using a UV light to cure the polymeric substance.

12. The method of claim 9, wherein the act of solidifying the polymeric substance comprises using heat to cure the polymeric substance.

13. The method of claim 7, further comprising heating the polymeric substance.

14. The method of claim 13, wherein the polymeric substance is heated after the polymeric substance is placed into the cavity.

15. The method of claim 13, wherein the polymeric substance is heated before the polymeric substance is placed into the cavity.

16. The method of claim 13, further comprising compressing the heated polymeric substance while the polymeric substance is in the cavity.

17. The method of claim 7, further comprising:
    removing the axicon lens from the cavity; and
    removing material at the second end to create a planar surface.

18. The method of claim 7, wherein the act of placing the polymeric substance into the axicon-shape cavity comprises:
    placing the polymeric substance at one end of the axicon-shape cavity; and
    using a plunger to press the polymeric substance into the axicon-shape cavity.

19. The method of claim 7, wherein the structure has an opening between the first end and a second end, and the act of placing the polymeric substance into the axicon-shape cavity comprises delivering the polymeric substance through the opening.

20. The method of claim 7, wherein the polymeric substance is in solid form.

21. The method of claim 7, wherein the fiber optic is indirectly coupled to the second end of the axicon lens.

* * * * *